United States Patent
Jarosz et al.

(10) Patent No.: US 9,472,016 B2
(45) Date of Patent: Oct. 18, 2016

(54) BIDIRECTIONAL POINT DISTRIBUTION FUNCTIONS FOR RENDERING GRANULAR MEDIA

(71) Applicants: Wojciech Jarosz, Zurich (CH); Johannes Meng, Zurich (CH); Marios Papas, Zurich (CH); Ralf Habel, Zurich (CH); Carsten Dachsbacher, Karlsruhe (DE); Steve Marschner, Ithaca, NY (US)

(72) Inventors: Wojciech Jarosz, Zurich (CH); Johannes Meng, Zurich (CH); Marios Papas, Zurich (CH); Ralf Habel, Zurich (CH); Carsten Dachsbacher, Karlsruhe (DE); Steve Marschner, Ithaca, NY (US)

(73) Assignee: Disney Enterprises, Inc., Burbank, CA (US)

( * ) Notice: Subject to any disclaimer, the term of this patent is extended or adjusted under 35 U.S.C. 154(b) by 375 days.

(21) Appl. No.: 13/842,204

(22) Filed: Mar. 15, 2013

(65) Prior Publication Data
US 2014/0267275 A1    Sep. 18, 2014

(51) Int. Cl.
*G06T 15/06* (2011.01)
*G06T 15/50* (2011.01)

(52) U.S. Cl.
CPC .............. *G06T 15/06* (2013.01); *G06T 15/506* (2013.01)

(58) Field of Classification Search
CPC ............................. G06T 15/506; G06T 15/50
USPC ........................................................ 345/326
See application file for complete search history.

(56) References Cited

U.S. PATENT DOCUMENTS

2012/0242679 A1* 9/2012 Teng et al. .................... 345/589

OTHER PUBLICATIONS

Moon, J. T., Walter, B., and Marschner, S. R. 2007. Rendering discrete random media using precomputed scattering solutions. In Eurographics Symposium on Rendering 2007, 231-242.*
B.W. Kimmel, G.V.G. Baranoski, "Simulating the appearance of sandy landscapes," Computers & Graphics, vol. 34, pp. 441-448, 2010.*
Chris Wynn. An Introduction to BRDF-Based Lighting, NVIDIA Corporation, 2000.*
Kalle Koutajoki, BSSRDF (Bidirectional surface Sacttering Distribution Function), Helsinki University of Technology, Spring 2002.*
Soulie' R, Me' rillou S,TerrazO,GhazanfarpourD., Modeling and rendering of heterogeneous granular materials: granite application. Computer Graphics Forum 2007;26(1):66-79.*
Qinghe Li, "Light Scattering of Semitransparent Media", Georgia Institute of Technology, ,May 2008.*

(Continued)

*Primary Examiner* — Devona Faulk
*Assistant Examiner* — Jin Ge
(74) *Attorney, Agent, or Firm* — Patterson + Sheridan, LLP

(57) ABSTRACT

The disclosure provides an approach for rendering granular media. According to one aspect of the disclosure, granular media are rendered using bidirectional point scattering distribution functions (BPSDFs). The dimensionality of BPSDFs may be reduced by making certain assumptions, such as random orientations of grains, thereby simplifying light transport for computational efficiency. To generate a BPSDF from a grain, light transport may be precomputed using a Monte Carlo simulation in which photons are shot onto the grain from all directions. The precomputed BPSDF may be used, during rendering, for describing the interactions within grains. When a light ray traced during rendering intersects proxy geometry which replaces grain geometry, the BPSDF may be evaluated to determine light transport. By repeating this process for many light rays in a Monte Carlo simulation, the light propagation through the granular medium may be determined.

19 Claims, 3 Drawing Sheets

A

B

(56) References Cited

OTHER PUBLICATIONS

J. Stam; "Multiple scattering as a diffusion process", Eurographics Rendering Workshop, pp. 41-50, 1995.

H.W. Jensen; J. Buhler; "A Rapid Hierarchical Rendering Technique for Translucent Materials", ACM Transactions on Graphics (TOG), vol. 21 Issue 3, pp. 576-581, Jul. 2002.

H.W. Jensen; S. Marschner; M. Levoy; P. Hanrahan, "A Practical Model for Subsurface Light Transport", in SIGGRAPH '01: Proceedings of the 28th annual conference on Computer graphics and interactive techniques, pp. 511-518, 2001.

E. D'eon; G. Irving, "A Quantized-Diffusion Model for Rendering Translucent Materials", ACM Transactions on Graphics (TOG)—Proceedings of ACM SIGGRAPH, vol. 30 Issue 4, Article No. 56, Jul. 2011.

\* cited by examiner

BIDIRECTIONAL POINT DISTRIBUTION FUNCTIONS FOR RENDERING GRANULAR MEDIA

BACKGROUND

1. Field

The disclosure provides techniques for rendering granular media composed of arbitrary shaped grains.

2. Description of the Related Art

Rendering applications applying ray-tracing techniques construct some subset of all light paths in a scene, each light path being characterized by a set of vertices and straight-line segments connecting the vertices. A complete light path describes how light is transported, potentially through many bounces, from a light source to a viewer. When the ray of light being traced intersects scene geometry or is determined to be interacting with some particle, a new path vertex is created. At vertices, the light may be altered in its direction, in the amount of energy, and the distribution of wavelengths.

Granular media typically correspond distinct macroscopic particles (also referred to herein as "grains"), which may have arbitrary shapes. Examples of granular media include sand, rice, sugar, salt, snow, coffee, corn flakes, among others. To accurately render granular media, a very large number of light rays are typically generated and intersected with grains of the media. Paths of these light rays leading from one grain to the next, as well as complicated paths of the light rays within individual grains, need to be computed, which can be computationally expensive.

SUMMARY

One aspect includes a computer implemented method for rendering a granular medium. The method includes computing a bidirectional point scattering distribution function (BPSDF) for one or more grains of the granular medium. The method further includes receiving geometry of a scene which includes the granular medium, and replacing grains of the granular medium in the scene with respective proxy. In addition, the method includes evaluating the BPSDF to determine light transport when a traced light ray intersects elements of the proxy geometry while rendering the scene.

Other aspects include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

DETAILED DESCRIPTION

Figure 1:
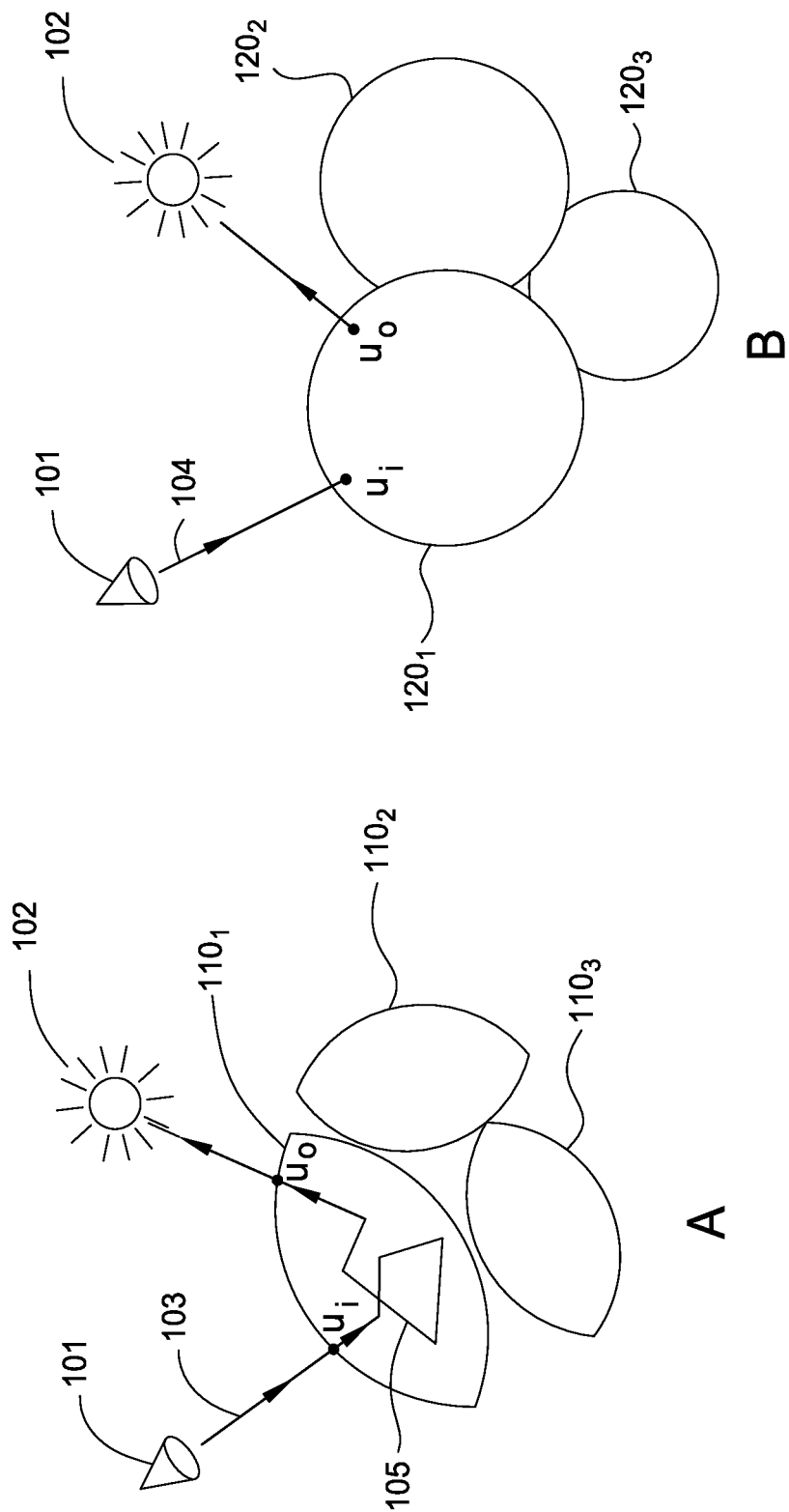
FIG. 1 illustrates an approach for rendering granular media using a bidirectional point scattering distribution function.

FIG. 1 illustrates an approach for rendering granular media using a bidirectional point scattering distribution function (BPSDF). As shown in panel A, a granular medium includes multiple grains $110_{1-3}$. The grains $110_{1-3}$ are distinct macroscopic particles, and may be individually visible in a rendering of the granular medium which is zoomed in sufficiently. Each of the grains $110_{1-3}$ may be defined by its shape, surface reflectance/transmittance and participating media. Although only three grains $110_{1-3}$ are depicted, granular media may generally include many grains, each of which may exhibit a distinct shape and surface properties.

Illustratively, a light path 103 traced by a rendering application (not shown) from a viewer 101 intersects geometry of the grain $110_1$ at point $\vec{u}_j$ and leaves the grain $110_1$ at point $\vec{u}_o$. The reflectance and transmission functions are evaluated on the surface of the grain $110_1$. If the path enters the grain, scattering and absorption events occur, which may be computationally expensive to simulate, especially when such simulations are performed for multiple grains of a granular medium.

Given a granular medium, aspects of this disclosure precompute a BPSDF which is a low-dimensional function that approximates important features of light transport through grains of the granular medium, thereby eliminating the need to simulating scattering within individual grains.

As shown, the grain $110_1$ has volume V and is bounded by surface M. In general, the grain $110_1$ may be described by its geometry, the scattering media inside the grain $110_1$, and reflectance/transmittance properties on the surface M. This formulation is equivalent to a general eight-dimensional bidirectional surface scattering reflectance distribution function (BSSRDF), which is a scattering function of incoming (two-dimensional) position $\vec{u}_j$ on the surface M and incoming (two-dimensional) direction $\vec{\omega}_i$ and respective outgoing position $\vec{u}_o$ and outgoing direction $\vec{\omega}_o$:

$$S(\vec{u}_i, \vec{\omega}_i, \vec{u}_o, \vec{\omega}_o). \tag{1}$$

Note, this formulation assumes a surface parameterization that defines a point on the surface with a two-dimensional vector $\vec{u}$ such as a unit sphere or a tangent space. The function S relates the incident flux at $(\vec{u}_i, \vec{\omega}_i)$ to the outgoing radiance at $(\vec{u}_o, \vec{\omega}_o)$. To determine outgoing radiance at $(\vec{u}_o, \vec{\omega}_o)$, the rendering application may perform the following four-dimensional integral which includes the function S:

$$L_i(\vec{u}_o, \vec{\omega}_o) = \int_M \int_{2\pi} S(\vec{u}_i, \vec{\omega}_i, \vec{u}_o, \vec{\omega}_o) L_i(\vec{u}_i, \vec{\omega}_o)(\vec{n}_i, \vec{\omega}_i) d\vec{\omega}_i dM(\vec{u}_i), \tag{2}$$

where $\vec{n}_i$ is the normal at point $\vec{u}_i$.

Aspects of this disclosure reduce the high-dimensional BSSRDF $S(\vec{u}_i, \vec{\omega}_i, \vec{u}_o, \vec{\omega}_o)$ while approximating import features of light transport through grains of granular media. As discussed, each grain may exhibit a distinct shape and surface properties. A simplifying assumption may be made, however, that properties are shared between grains of a granular medium such that the grains may be classified according to type. For example, salt mixed with sand may include two types of grains, namely salt grains and sand grains. Each type of grain may be associated with a respective BPSDF, which may be a precomputed low-dimensional function applied to the scattering integral of equation (2) in lieu of the high-dimensional BSSRDF. The number of types is not limited, and the rendering application may model which particular grain has which BPSDF statistically, or with (volumetric) maps for full control.

Deriving the low-dimensional BPSDF from the high-dimensional BSSRDF may require multiple dimensional reductions. In one aspect, spatial dependence may be removed from the BSSRDF by assuming that all scattering events, on the surface of grains or inside the grains, happen at the center (e.g., the center of mass) of the grain. This results in a four-dimensional function only dependent on the incoming direction $\vec{\omega}_i$ and the outgoing direction $\vec{\omega}_o$. The radiance integral of equation (2) is then reduced to:

$$L_o(\vec{\omega}_o) = \int_{4\pi} P(\vec{\omega}_i, \vec{\omega}_o) L_i(\vec{\omega}_i) d\vec{\omega}_i. \qquad (3)$$

With the BPSDF $P(\vec{\omega}_i, \vec{\omega}_o)$, the radiance integral is over the whole sphere of directions, and no $(\vec{n}_i, \vec{\omega}_i)$ term is present due to the fact that there is no normal defined. This means that spatial locality is lost, reducing the grain to a point.

In another aspect, the four-dimensional BPSDF $P(\vec{\omega}_i, \vec{\omega}_o)$ may be further reduced to a two-dimensional BPSDF by only considering the difference between the angles $\omega_i=(\phi_i, \theta_i)$, $\omega_o=(\phi_o, \theta_o)$, with the degrees of freedom being $\Delta\phi$, $\Delta\theta$. In yet another aspect, the two-dimensional BPSDF may be further reduced to one dimension, with the only degree of freedom being the relative angle between $\omega_i$, $\omega_o$.

In alternative aspects, one or more spatial degrees of freedom may be retained. For example, a spatial degree of freedom corresponding to radial offset of the incident light from the center of the grain may be used, along with the distance between the angles $\omega_i$ and $\omega_o$. Doing so eliminates the need to orient the grain, while still being spatially dependent in one degree of freedom.

Light transport may be simulated using a Monte Carlo simulation during a precomputation step to generate the low-dimensional BPSDF. In such a Monte Carlo simulation, photons may be shot onto a grain from substantially all directions and spatial offsets, with the photons distributed in all degrees of freedom of the BPSDF. A precomputation application may then record the spatial offsets and outgoing directions and intensities of the photons. For example, the photons may be binned according to the dimensional reduction chosen for the BPSDF to avoid recording a full BSSRDF function. The number of bins in each degree of freedom defines the resolution of the resulting tabulated BPSDF. For a more efficient representation, the Monte Carlo simulation may also be projected onto some basis, such as polynomials (e.g., Spherical Harmonics), wavelets, tent functions, parametric phase functions (e.g., a Henyey-Greenstein phase function or a superposition of such functions), etc.

Panel B shows a rendering of the scene which includes the granular medium. As shown, a rendering application (not shown) replaces the grains $110_{1-3}$ with proxy geometry, illustrated as spheres $120_{1-3}$, during the rendering. Doing so may improve computational efficiency. The proxy geometry for a given grain may be any shape and size, such as a convex hull of the grain's geometry, a bounding sphere, etc. In some embodiments, geometry of individual grains may be replaced with proxy geometry under certain circumstances. As discussed in greater detail below, two such circumstances may include the camera being zoomed sufficiently away from the granular media, and the number of bounces between grains being greater than a given number. In these cases, the BPSDF may be used to replace simulations of interactions within individual grains, as the simplifying assumptions of the BPSDF, such as random orientations of grains, may be more appropriate.

As shown, the rendering application traces a light ray 104 to the granular medium. Where, the light ray 104 intersects the proxy geometry $120_1$, the rendering application evaluates the precomputed BPSDF function. Such an evaluation may include, e.g., looking up a tabulated BPSDF value or evaluating a Spherical Harmonic, wavelet, or Henyey-Greenstein phase function, etc. By evaluating the BPSDF, the rendering application obtains the light transport through the grain, without having to simulate the complex scattering of light within the grain itself that is represented by the proxy geometry $120_1$. That is, instead of computing scattering inside intersected grains, the rendering application selects a BPSDF corresponding to the grain's type and samples an outgoing path vertex from the BPSDF. By repeating this process for many light rays in the Monte Carlo simulation, the rendering application may determine the light propagation through the granular medium.

Figure 2:
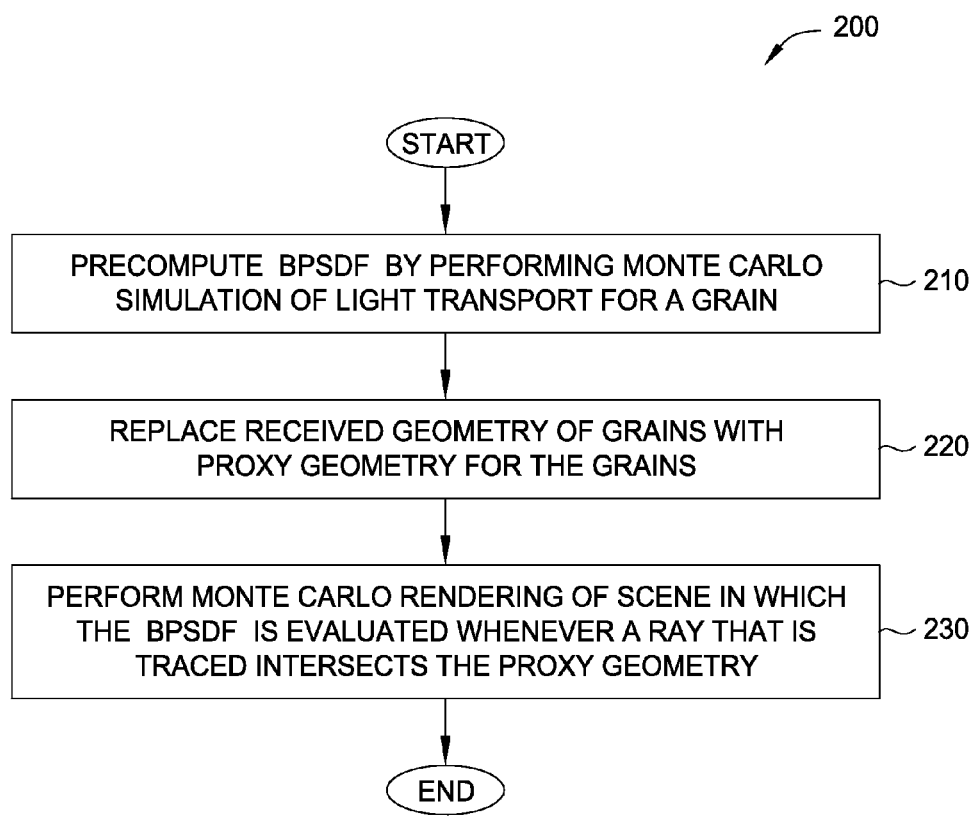
FIG. 2 illustrates a method for rendering an image which includes granular media.

FIG. 2 illustrates a method 200 for rendering an image which includes granular media. As shown, the method 200 begins at step 210, where a BPSDF is precomputed by performing a Monte Carlo simulation of light transport for one or more grains of the granular media. In the Monte Carlo simulation, which may be performed using, e.g., a virtual goniophotometer, photons may be shot onto a grain from substantially all directions and spatial offsets, and spatial offsets and outgoing directions and intensities of the photons recorded. Here, care should be taken to distribute the photons being shot in all degrees of freedom of the BPSDF. A given photon may be shot at the grain and scattered according to the position on M and, depending on if the photon travels inside the grain, scattered inside V until it leaves the grain. The scattering inside V may be simulated using any feasible means, such as known volumetric scattering techniques.

In one aspect, the photons being shot at the grain may be binned according to the dimensional reduction chosen for the BPSDF to avoid recording a full BSSRDF function. In such a case, the number of bins in each degree of freedom defines the resolution of the resulting tabulated BPSDF. In an alternative aspect, the Monte Carlo simulation may be projected onto some basis, such as polynomials (e.g., Spherical Harmonics), wavelets, tent functions, parametric phase functions (e.g., Henyey-Greenstein phase function or a superposition of such functions), etc. This is in contrast to the tabulated BPSDF, which is equivalent to a projection onto a piecewise constant basis set. If the form of the measured BPSDF is close to a parametric phase function, the precomputation application may fit a Henyey-Greenstein phase function (or some other phase function) to the BPSDF. A global factor in addition to the anisotropy factor g may be fit to account for the absorption of the scattering within the grain.

In another aspect, a BPSDF may be precomputed for each type of grain, where grains of the same type share certain properties (e.g., shape, material composition, etc.). Any number of types of grains may be present in a given granular medium, and the rendering application may model which particular grain has which BPSDF statistically, or with (volumetric) maps for full control.

The BPSDF may be based on multiple dimensionality-reducing assumptions which make the eight-dimensional radiance integral of equation (2) more computationally tractable. In one aspect, spatial dependence may be removed by assuming that all scattering events happen at the center (e.g., the center of mass) of the grain, resulting in a four-dimensional BPSDF function dependent on only the incoming direction $\vec{\omega}_i$ and the outgoing direction $\vec{\omega}_o$. In such a case, spatial locality is lost, reducing the grain to a point. In another aspect, the four-dimensional BPSDF may be further reduced to a two-dimensional BPSDF by only considering the difference between the angles $\omega_i=(\phi_i,\theta_i)$, $\omega_o=(\phi_o,\theta_o)$, with the degrees of freedom being $\Delta\phi$, $\Delta\theta$. In a yet another aspect, the two-dimensional BPSDF may be further reduced to one dimension, with the only degree of freedom being the relative angle between $\omega_i$ and $\omega_o$. In alternative aspects, one or more spatial degrees of freedom may be retained, such as a spatial degree of freedom corresponding to radial offset of the incident light from the center of the grain, which may be used along with the distance between the angles $\omega_o$.

At step 220, a rendering application alters received granular media geometry in a scene by replacing geometry of the grains with proxy geometry. The proxy geometry for a given grain may be any shape and size. Examples include a convex hull of the grain's geometry, a bounding sphere, and the like. The particular choice of proxy geometry may generally depend on the simplifying assumptions made to the BPSDF. For example, where an assumption is made that orientations of the grains are random, with the BPSDF being the function of the difference between incoming and outgoing angles $\omega_i$, $\omega_o$, the rendering application may replace geometry of each grain with spherical proxy geometry, and render the scene using such proxy geometry. Where the orientation of the grains are not assumed to be random, the proxy geometry used may be, e.g., a convex hull. Alternatively, no proxy geometry may be used, i.e., the original grain geometry may be used.

In some aspects, geometry of individual grains may be replaced with proxy geometry under certain circumstances. Two such circumstances may include the camera being zoomed sufficiently away from the granular media, and the number of bounces between grains being greater than a given number. Where the camera is zoomed out such that, e.g., the fine structure of individual grains is no longer visible, the simplifying assumptions of the BPSDF, such as random orientation of grains, may be more appropriate, and the rendering application may replace grain geometry with proxy geometry so as to make use of the BPSDF. Conversely, where, e.g., fine structure of individual grains is visible, the rendering application may use actual grain geometry and simulate interactions within individual grains normally, without using the BPSDF. Where the number of bounces between grains is greater than a given number (e.g., 3), the light rays may be less noticeable, particularly if the light has penetrated through several layers of grains and is thus viewed indirectly through those layers. In one aspect, the rendering application may simulate interactions within individual grains up to the given number of bounces, then use the BPSDF to replace simulations of interactions in further grains which the light intersects.

At step 230, the rendering application performs a Monte Carlo rendering of the scene in which the BPSDF is evaluated whenever a ray being traced intersects the proxy geometry. The Monte Carlo rendering may use, e.g., forward path tracing, or any other ray tracing technique in which multiple light rays are shot at, and intersect with, proxy geometry representing grains of the granular medium. Where, a light ray intersects proxy geometry, the rendering application may evaluate the precomputed BPSDF function by e.g., looking up a tabulated BPSDF value or evaluating a spherical harmonic, wavelet, Henyey-Greenstein phase function, superposition of Henyey-Greenstein phase functions, etc. Doing so gives the light transport through the grain, without having to simulate the scattering of light within the grain itself. That is, to determine light transport, the rendering application may simply select a BPSDF corresponding to the grain's type and sample an outgoing path vertex from the BPSDF. This makes the Monte Carlo rendering more computationally tractable, as scattering events within individual grains are not simulated.

Although discussed above primarily with respect to BPSDFs which capture interactions within single grains, in other aspects, BPSDFs may be generated for multiple grains. Without such simplification, a large number of light ray intersections with different proxy geometry may occur during rendering as light bounces between grains of granular media. Rendering simulations of such interactions may be reduced by precomputing the interactions for multiple grains and using proxy geometry to replace those multiple grains, thereby reducing the computation load during rendering.

Figure 3:
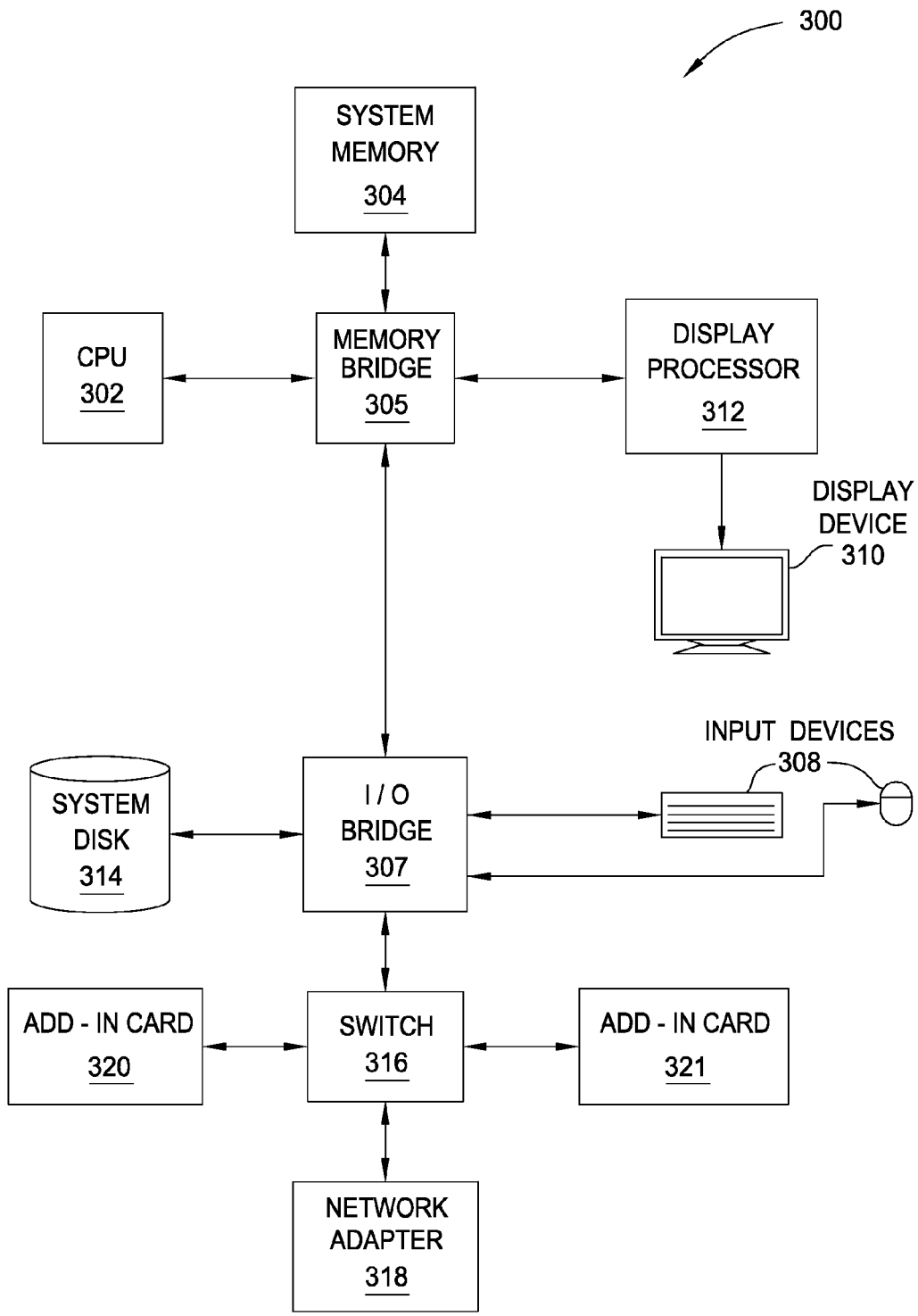
FIG. 3 is a block diagram of a system configured to implement one or more aspects of the disclosure.

FIG. 3 is a block diagram of a system 300 configured to implement one or more aspects of the disclosure. System 300 may be a computer workstation, personal computer, video game console, personal digital assistant, rendering engine, mobile phone, or any other device suitable.

As shown, system 300 includes a central processing unit (CPU) 302 and a system memory 304 communicating via a bus path that may include a memory bridge 305. CPU 302 includes one or more processing cores, and, in operation, CPU 302 is the master processor of system 300, controlling and coordinating operations of other system components. System memory 304 stores software applications and data for use by CPU 302. CPU 302 runs software applications and optionally an operating system. Memory bridge 305, which may be, e.g., a Northbridge chip, is connected via a bus or other communication path (e.g., a HyperTransport link) to an I/O (input/output) bridge 307. I/O bridge 307, which may be, e.g., a Southbridge chip, receives user input from one or more user input devices 308 (e.g., keyboard, mouse, joystick, digitizer tablets, touch pads, touch screens, still or video cameras, motion sensors, and/or microphones) and forwards the input to CPU 302 via memory bridge 305.

A display processor 312 is coupled to memory bridge 305 via a bus or other communication path (e.g., a PCI Express, Accelerated Graphics Port, or HyperTransport link). In one configuration, display processor 312 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 304.

Display processor 312 periodically delivers pixels to a display device 330 (e.g., a screen or conventional CRT, plasma, OLED, SED or LCD based monitor or television). Additionally, display processor 312 may output pixels to film recorders adapted to reproduce computer generated images on photographic film. Display processor 312 can provide display device 330 with an analog or digital signal.

A system disk 314 is also connected to I/O bridge 307 and may be configured to store content and applications and data for use by CPU 302 and display processor 312. System disk 314 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 316 provides connections between I/O bridge 307 and other components such as a network adapter 318 and various add-in cards 320 and 321. Network adapter 318 allows system 300 to communicate with other systems via an electronic communications network, and may include wired or wireless communication over local area networks and wide area networks such as the Internet.

Other components (not shown), including USB or other port connections, film recording devices, and the like, may also be connected to I/O bridge 307. For example, an audio processor may be used to generate analog or digital audio output from instructions and/or data provided by CPU 302, system memory 304, or system disk 314. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one configuration, display processor 312 incorporates circuitry optimized for graphics and video processing, including, for example, video output circuitry, and constitutes a graphics processing unit (GPU). In another configuration, display processor 312 incorporates circuitry optimized for general purpose processing. In yet another configuration, display processor 312 may be integrated with one or more other system elements, such as the memory bridge 305, CPU 302, and I/O bridge 307 to form a system on chip (SoC). In still further configurations, display processor 312 is omitted and software executed by CPU 302 performs the functions of display processor 312.

Pixel data can be provided to display processor 312 directly from CPU 302. In some configurations, instructions and/or data representing a scene are provided to a render farm or a set of server computers, each similar to system 300, via network adapter 318 or system disk 314. The render farm generates one or more rendered images of the scene using the provided instructions and/or data. These rendered images may be stored on computer-readable media in a digital format and optionally returned to system 300 for display. Similarly, stereo image pairs processed by display processor 312 may be output to other systems for display, stored in system disk 314, or stored on computer-readable media in a digital format.

Alternatively, CPU 302 provides display processor 312 with data and/or instructions defining the desired output images, from which display processor 312 generates the pixel data of one or more output images, including characterizing and/or adjusting the offset between stereo image pairs. The data and/or instructions defining the desired output images can be stored in system memory 304 or graphics memory within display processor 312. In one configuration, display processor 312 includes 3D rendering capabilities for generating pixel data for output images from instructions and data defining the geometry, lighting, shading, texturing, motion, and/or camera parameters for a scene. Display processor 312 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some configurations, system memory 304 is connected to CPU 302 directly rather than through a bridge, and other devices communicate with system memory 304 via memory bridge 305 and CPU 302. In other alternative topologies display processor 312 is connected to I/O bridge 307 or directly to CPU 302, rather than to memory bridge 305. In still other configurations, I/O bridge 307 and memory bridge 305 might be integrated into a single chip. The particular components shown herein are optional; for instance, any number of add-in cards or peripheral devices might be supported. In some configurations, switch 316 is eliminated, and network adapter 318 and add-in cards 320, 321 connect directly to I/O bridge 307.

According to aspects of this disclosure, granular media are rendered using bidirectional point scattering distribution functions (BPSDFs). As discussed, the dimensionality of the BPSDFs may be reduced by making certain assumptions, simplifying the light transport for computational efficiency. To generate a BPSDF from a grain defined by its shape, surface reflectance/transmittance and participating media, a precomputation application may simulate light transport using a Monte Carlo simulation in which photons are shot onto the grain from all directions, as discussed above with respect to FIG. 2. The precomputed BPSDF may then be used, during rendering, as a drop-in replacement for describing the interactions within individual grains. The precomputation and rendering applications may be executed, at least in part, by display processor 312. In other aspects, the precomputation and rendering applications may be implemented in software stored in system memory 304 and executed by CPU 302 and/or display processor 312. In still further aspects, the precomputation and rendering applications may be implemented in fixed function hardware included within display processor 312. Other aspects may be implemented as a combination of hardware and software.

Advantageously, aspects disclosed herein precompute light transport through one or multiple grains of a granular media to generate BPSDFs. The BPSDFs may be used in Monte Carlo rendering of the granular media to replace simulations of light scattering events within one or multiple grains, thereby improving computational efficiency. In addition, various assumptions may be made in the BPSDF, reducing the dimensionality of the function and simplifying the light transport to gain computational speed.

The foregoing description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer-implemented method for rendering a granular medium, comprising:
   computing a bidirectional point scattering distribution function (BPSDF) for a single grain or multiple grains of the granular medium, wherein the BPSDF approximates light transport through the single grain or multiple grains, and wherein the BPSDF is derived from a bidirectional surface scattering reflectance distribution function (BSSRDF) through dimensionality-reducing assumptions including an assumption that a plurality of scattering events occur at a center of the single grain or multiple grains;
   receiving geometry of a scene which includes the granular medium;
   replacing grains of the granular medium in the scene with proxy geometry representing single grains or groups of grains each having the multiple grains;
   evaluating the BPSDF to determine light transport through the grains when a traced light ray intersects elements of the proxy geometry representing the grains while rendering the scene; and
   displaying at least a rendered image of the scene as output on a display device, wherein one or more pixel values of the rendered image are determined, at least in part, based on the evaluating of the BPSDF,
   wherein the grains are replaced with the proxy geometry and the BPSDF is evaluated either when a camera is zoomed away from the granular medium by at least a predefined amount or when the traced light ray bounces between at least a predefined number of grains of the granular medium.

2. The method of claim 1, wherein the proxy geometry includes one or more spheres or convex hulls.

3. The method of claim 1, wherein the BPSDF is a four-dimensional function dependent on an incoming direction and an outgoing direction of light.

4. The method of claim 1, wherein the BPSDF is a two-dimensional function of differences between angles of an incoming direction and an outgoing direction of light.

5. The method of claim 1, wherein the BPSDF is a one-dimensional function of a relative angle between an incoming direction and an outgoing direction of light.

6. The method of claim 1, wherein the BPSDF is a two-dimensional function of a radial offset of light from a grain center and a relative angle between an incoming direction and an outgoing direction of the light.

7. The method of claim 1, wherein computing the BPSDF includes performing a Monte Carlo simulation in which multiple photons are shot at the single grain or multiple grains, and determining the number of photons which land in each of a plurality of bins distributed across degrees of freedom of the BPSDF.

8. The method of claim 1, wherein computing the BPSDF includes performing a Monte Carlo simulation in which multiple photons are shot at the single grain or multiple grains, and projecting outgoing light rays onto a basis.

9. The method of claim 1, wherein the scene is rendered using a Monte Carlo ray tracing technique.

10. A non-transitory computer-readable storage medium storing instructions, which when executed by a computer system, perform operations for rendering a granular medium, comprising:
    computing a bidirectional point scattering distribution function (BPSDF) for a single grain or a multiple grains of the granular medium, wherein the BPSDF approximates light transport through the single grain or multiple grains, and wherein the BPSDF is derived from a bidirectional surface scattering reflectance distribution function (BSSRDF) through dimensionality-reducing assumptions including an assumption that a plurality of scattering events occur at a center of the single grain or multiple grains;
    receiving geometry of a scene which includes the granular medium;
    replacing grains of the granular medium in the scene with proxy geometry representing single grains or groups of grains each having the multiple grains;
    evaluating the BPSDF to determine light transport through the grains when a traced light ray intersects elements of the proxy geometry representing the grains while rendering the scene; and displaying at least a rendered image of the scene as output on a display device, wherein one or more pixel values of the rendered image are determined, at least in part, based on the evaluating of the BPSDF, wherein the grains are replaced with the proxy geometry and the BPSDF is evaluated either when a camera is zoomed away from the granular medium by at least a predefined amount or when the traced light ray bounces between at least a predefined number of grains of the granular medium.

11. The computer-readable storage medium of claim 10, wherein the proxy geometry includes one or more spheres or convex hulls.

12. The computer-readable storage medium of claim 10, wherein the BPSDF is a four-dimensional function dependent on an incoming direction and an outgoing direction of light.

13. The computer-readable storage medium of claim 10, wherein the BPSDF is a two-dimensional function of differences between angles of an incoming direction and an outgoing direction of light.

14. The computer-readable storage medium of claim 10, wherein the BPSDF is a one-dimensional function of a relative angle between an incoming direction and an outgoing direction of light.

15. The computer-readable storage medium of claim 10, wherein the BPSDF is a two-dimensional function of a radial offset of light from a grain center and a relative angle between an incoming direction and an outgoing direction of the light.

16. The computer-readable storage medium of claim 10, wherein computing the BPSDF includes performing a Monte Carlo simulation in which multiple photons are shot at the single grain or multiple grains, and determining the number of photons which land in each of a plurality of bins distributed across degrees of freedom of the BPSDF.

17. The computer-readable storage medium of claim 10, wherein computing the BPSDF includes performing a Monte Carlo simulation in which multiple photons are shot at the single grain or multiple grains, and projecting outgoing light rays onto a basis.

18. The computer-readable storage medium of claim 10, wherein the scene is rendered using a Monte Carlo ray tracing technique.

19. A system, comprising:

a processor; and a memory, wherein the memory includes an application program configured to perform operations for rendering a granular medium, comprising:

computing a bidirectional point scattering distribution function (BPSDF) for a single grain or multiple grains of the granular medium, wherein the BPSDF approximates light transport through the single grain or multiple grains, and wherein the BPSDF is derived from a bidirectional surface scattering reflectance distribution function (BSSRDF) through dimensionality-reducing assumptions including an assumption that a plurality of scattering events occur at a center of the single grain or multiple grains, receiving geometry of a scene which includes the granular medium, replacing grains of the granular medium in the scene with proxy geometry representing single grains or groups of grains each having the multiple grains, evaluating the BPSDF to determine light transport through the grains when a traced light ray intersects elements of the proxy geometry representing the grains while rendering the scene, and displaying at least a rendered image of the scene as output on a display device, wherein one or more pixel values of the rendered image are determined, at least in part, based on the evaluating of the BPSDF, wherein the grains are replaced with the proxy geometry and the BPSDF is evaluated either when a camera is zoomed away from the granular medium by at least a predefined amount or when the traced light ray bounces between at least a predefined number of grains of the granular medium.

* * * * *